(12) United States Patent
Laurent et al.

(10) Patent No.: US 7,407,646 B2
(45) Date of Patent: Aug. 5, 2008

(54) HYDROPHILIC POLYMER BIOMATERIAL HAVING A SPECIFIC MAGNETIC RESONANCE IMAGING SIGNAL AND PROCESS FOR THE PREPARATION OF SAID BIOMATERIAL

(75) Inventors: Alexandre Laurent, Courbevoie (FR); Denis Labarre, Villebon (FR)

(73) Assignee: L'Assistance Publique-Hopitaux de Paris Etablissement Public de Sante, Paris (FR)

( * ) Notice: Subject to any disclaimer, the term of this patent is extended or adjusted under 35 U.S.C. 154(b) by 0 days.

(21) Appl. No.: 10/278,256

(22) Filed: Oct. 23, 2002

(65) Prior Publication Data

US 2003/0077225 A1  Apr. 24, 2003

Related U.S. Application Data

(63) Continuation of application No. PCT/FR01/01267, filed on Apr. 25, 2001.

(30) Foreign Application Priority Data

Apr. 25, 2000  (FR) .................................. 00 05400

(51) Int. Cl.
    *A61B 5/055* (2006.01)
(52) U.S. Cl. .................. 424/9.323; 424/1.65; 424/1.29; 424/9.3; 424/9.32; 424/9.322
(58) Field of Classification Search ................ 424/1.11, 424/1.29, 1.65, 1.73, 9.1, 9.3, 9.32, 9.321, 424/9.322, 9.323, 9.35, 9.36
See application file for complete search history.

(56) References Cited

U.S. PATENT DOCUMENTS

| | | | | |
|---|---|---|---|---|
| 4,587,284 A | * | 5/1986 | Luissi et al. | .................. 524/17 |
| 5,492,814 A | | 2/1996 | Weissleder | |
| 5,684,051 A | * | 11/1997 | Thompson | .................. 514/777 |
| 6,368,586 B1 | * | 4/2002 | Jacob et al. | .............. 424/78.08 |
| 6,685,963 B1 | * | 2/2004 | Taupin et al. | ................ 424/486 |

FOREIGN PATENT DOCUMENTS

| | | |
|---|---|---|
| WO | 94/23782 | * 10/1994 |
| WO | WO 94/23782 | * 10/1994 |
| WO | WO 95 05669 A | 2/1995 |
| WO | WO 99 19000 A | 4/1999 |

* cited by examiner

*Primary Examiner*—D. L Jones
(74) *Attorney, Agent, or Firm*—Oblon, Spivak, McClelland, Maier & Neustadt, P.C.

(57) ABSTRACT

A charged biomaterial including at least one first hydrophilic polymer, and superparamagnetic iron oxide particles complexed with a second hydrophilic polymer substantially identical to or different from the first hydrophilic polymer, wherein the superparamagnetic iron oxide particles complexed with the second hydrophilic polymer are distributed substantially homogeneously and substantially without aggregates in the first hydrophilic polymer. A process for preparing a charged biomaterial including forming an aqueous solution of hydrophilic monomers and superparamagnetic iron oxide particles complexed with a hydrophilic polymer including monomers substantially identical to or different from the hydrophilic monomers, polymerizing the solution and forming a polymer hydrogel in which are distributed substantially homogeneously and substantially without aggregates the superparamagnetic iron oxide particles complexed with the hydrophilic polymer.

23 Claims, 3 Drawing Sheets

| | SIGNAL T1 | SIGNAL T2 | SIGNAL FE | Reduction T1 (%) | Reduction T2 (%) | Reduction FE (%) |
|---|---|---|---|---|---|---|
| Gel +0,12mumolFe/ml | 46 | 7 | 34 | 69 | 86 | ch76 |
| Gel + 0.012mumolFe/ml | 94 | 9 | 85 | 36 | 82 | 40 |
| Gel + 0.0012mumolFe/ml | 84 | 12 | 63 | 43 | 76 | 55 |
| f6Gel + 0.00012mumolFe/ml | 150 | 43 | 150 | -2 | 12 | -6 |
| Uncharged gel | 147 | 49 | 141 | 0 | 00 | 0 |
| Oil | 183 | 56 | 137 | ch-24 | -14 | 3 |
| Water | 37 | 86 | 78 | 75 | -76 | 45 |
| Water+0,12mumolFe/ml | 155 | 41 | 155 | -5 | 16 | -10 |

HYDROPHILIC POLYMER BIOMATERIAL HAVING A SPECIFIC MAGNETIC RESONANCE IMAGING SIGNAL AND PROCESS FOR THE PREPARATION OF SAID BIOMATERIAL

RELATED APPLICATION

This is a continuation of International Application No. PCT/FR01/01267, with an international filing date of Apr. 25, 2001, which is based on French Patent Application No. 00/05400, filed Apr. 25, 2000.

FIELD OF THE INVENTION

This invention pertains to the domain of biomaterials detectable in magnetic resonance imaging, more specifically, to a biomaterial charged with superparamagnetic iron oxide particles to have a signal different from that of the uncharged biomaterial and that of the biological environment in which it is placed for one or more types of MRI sequences.

BACKGROUND

A biomaterial is a material tolerated by the human body which can be employed in the composition of a medical device. The contact between the biomaterial and the human body can be temporary, for the implementation of an image or images, or permanent, especially for the creation of an implant. This contact can relate to all or part of the biomaterial.

There is no knowledge in the prior art of a biomaterial constituted of at least one hydrophilic polymer and comprising a marker to have a signal different from that of the uncharged biomaterial and that of the biological environment in which it is placed. Known in the prior art are solely medical devices comprising a marker as well as contrast agents comprising a marker for magnetic resonance imaging.

Known in the prior art is, e.g., WO 94/23782, which pertains to medical devices such as catheters comprising nonmetallic members having paramagnetic ionic particles incorporated in the interior. The paramagnetic ionic particles are coated with a coating agent, the role of which is to retain water or any proton-donor liquid around the ionic particles since the medical device does not contain them. The results obtained are of very low significance: only a slight, not significant augmentation of the spin echo signal (T1, T2) and gradient echo signal is seen.

Also known is the preparation of colloidal magnetite solutions stabilized by different agents (Massart 1981, IEEE 17; Pouliquen and Chouly in "Microspheres microcapsules and liposomes 2", for review).

Particles constituted of a polymer and iron oxide nanoparticles forming a superparamagnetic agent for the preparation of an injectable contrast agent to enable signalizing of e.g., hepatic tumors (cf. Fahlvik 1993, JMRI 3: 187-194; Chambon 1993 Magn Resol Imaging, 11: 509-519 are also known.

These contrast agents do not constitute a biomaterial in the classic sense of the term nor do they enable creation by themselves of a biomaterial.

The creation of a biomaterial for MRI is difficult and risky. In fact, if the superparamagnetic iron oxide particles are introduced directly into the material before polymerization, their distribution is inhomogeneous: they form aggregates and the signal obtained (image or extinction of image) is not processed because of the presence of numerous artifacts. It is necessary to be able to control the distribution in the biomaterial, i.e., the average distance between each marker grain to obtain precisely the desired signal.

It would therefore be advantageous to complex the superparamagnetic iron oxide particles with a hydrophilic polymer and to distribute them homogeneously in the hydrophilic polymer of the biomaterial to obtain a biomaterial having a specific signal different from that of the uncharged biomaterial and that of the biological environment in which it is placed.

SUMMARY OF THE INVENTION

This invention relates to a charged biomaterial including at least one first hydrophilic polymer, and superparamagnetic iron oxide particles complexed with a second hydrophilic polymer substantially identical to or different from the first hydrophilic polymer, wherein the superparamagnetic iron oxide particles complexed with the second hydrophilic polymer are distributed substantially homogeneously and substantially without aggregates in the first hydrophilic polymer.

This invention also relates to a process for preparing a charged biomaterial including forming an aqueous solution of hydrophilic monomers and superparamagnetic iron oxide particles complexed with a hydrophilic polymer including monomers substantially identical to or different from the hydrophilic monomers, polymerizing the solution and forming a polymer hydrogel in which are distributed substantially homogeneously and substantially without aggregates the superparamagnetic iron oxide particles complexed with the hydrophilic polymer.

BRIEF DESCRIPTION OF THE DRAWINGS

Better understanding of the invention will be obtained from the description below of a mode of implementation of the invention presented for purely explanatory purposes and with reference to the attached drawings in which.

DETAILED DESCRIPTION

Figures 1, 2:
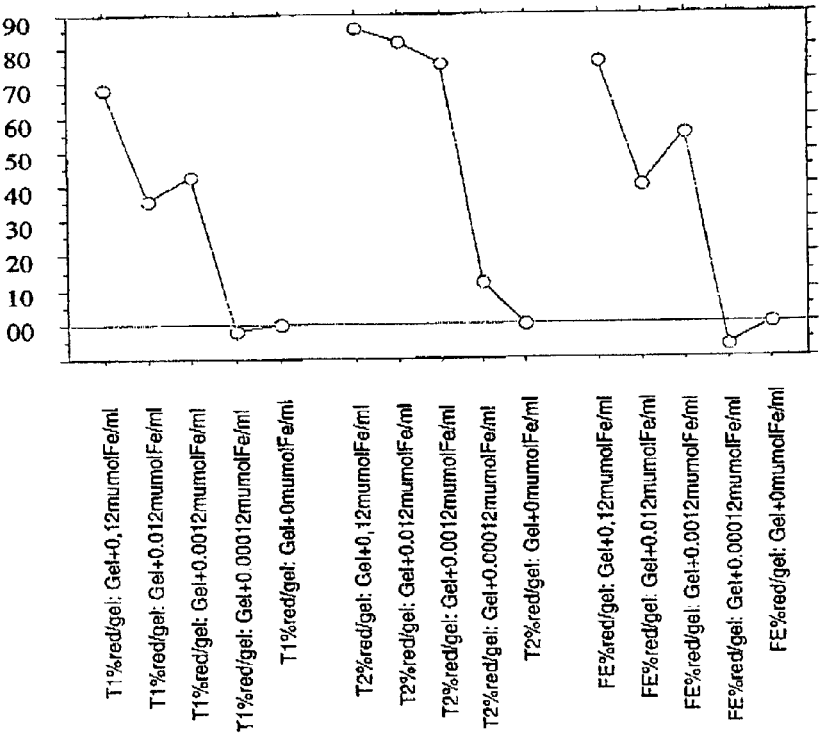
FIG. 1 illustrates a comparative table of the signal reduction obtained with a biomaterial according to the invention.
FIG. 2 illustrates the results presented in FIG. 1 by means of a curve comprising as ordinate the percentage of signal reduction obtained.

This invention is remarkable in that superparamagnetic particles are complexed with a hydrophilic polymer substantially identical to or different from that of the biomaterial, and in that superparamagnetic iron oxide particles complexed with a hydrophilic polymer are distributed substantially homogeneously without aggregates in the hydrophilic polymer of the biomaterial.

The term "hydrophilic polymer" is understood to mean a natural or synthetic polymer having a high affinity for water, being capable of taking up a large volume of water and becoming a hydrogel. A "water-soluble" polymer is a hydrophilic polymer capable of dissolving in an aqueous solution. The term "complexing" is understood to mean an interaction without chemical binding.

The invention is also remarkable in that the hydrophilic polymer of the biomaterial comprises a quantity of complexed superparamagnetic iron oxide particles which is proportional to the desired signal. The invention is also remarkable in that the hydrophilic polymer of the biomaterial comprises on the order of about $10^{-1}$% to about $10^{-6}$% in dry weight of superparamagnetic iron oxide particles.

The invention is further remarkable in that the biomaterial can constitute, among other things:
- an implant for vascular occlusion, to natural cavities, artificial cavities or surgical cavities; or
- a tissue reconstruction biomaterial;
- or a biomaterial for covering body surfaces, catheters, probes, drains, prostheses or the like; or
- a marker-reference coordinate that can be implantable or not implantable.

The invention also pertains to a process for the preparation of a biomaterial according to the invention. The process is remarkable in that one mixes in an aqueous solution of hydrophilic monomers, superparamagnetic iron oxide particles complexed with a hydrophilic polymer constituted of monomers substantially identical with or different from the first-mentioned monomers, then one polymerizes this mixture to obtain a polymer hydrogel in which the superparamagnetic iron oxide particles complexed with a hydrophilic polymer are distributed homogeneously without aggregates.

The process is also remarkable in that the hydrophilic polymer constituting the biomaterial can be a water-soluble polymer and in that the mixture is cross-linked to obtain a polymer hydrogel in which the superparamagnetic iron oxide particles complexed with a hydrophilic polymer are distributed substantially homogeneously without aggregates.

The hydrogel obtained in this manner can then be presented in the form of a hydrogel with a high or low water content or in the form of a solid biomaterial obtained after drying or lyophilization and intended to be used as such or to be rehydrated.

The biomaterial according to the invention thus has a significant signal extinction which is substantially homogeneous throughout the material in classic medical MRI sequences, in spin echo (T1, T2) and in gradient echo sequences. The biomaterial according to the invention makes it possible to have the same signal variation direction in the principal sequences of medical MRI, in spin echo (T1, T2) and in gradient echo.

The process according to the invention thus advantageously makes it possible to differentiate the biomaterial from the surrounding soft tissues which have an intermediate signal (gray, when they are not necrotic) or a hypersignal when they are edematous.

The process according to the invention also advantageously makes it possible to differentiate the biomaterial from the vascular contrast agents of the marked structures (e.g., gadolinium) because the very vascularized tissues, and more particularly, the hypervascular tumors, acquire a hypersignal after the injection.

The biomaterial according to the invention also advantageously has an exactly reproducible signal in MRI as a function of the concentration of markers formed by the superparamagnetic iron oxide particles complexed with a hydrophilic polymer and as a function of the water content.

The biomaterial according to the invention also advantageously has a stable marking when it is in contact with an aqueous medium, the marker being solidly fixed in the biomaterial which does not precipitate out.

Consequently:
- when the biomaterial is constituted of a unresorbable polymer, the biomaterial marked according to the process advantageously conserves its marking in a durable manner if it is implanted in the human body, and
- when the biomaterial is constituted of a resorbable polymer, the biomaterial marked according to the process advantageously conserves its marking which is proportional to its resorption if it is implanted in the human body which makes it possible to monitor its resorption.

The biomaterial according to the invention is a biomaterial charged with superparamagnetic iron oxide particles to have a signal different from that of the uncharged biomaterial and that of the biological environment in which it is placed for one or more types of MRI sequences, the biomaterial being constituted of at least one hydrophilic polymer.

The biomaterial according to the invention is characterized in that the superparamagnetic iron oxide particles are complexed with a hydrophilic polymer substantially identical to or different from that of the biomaterial, and in that the superparamagnetic iron oxide particles complexed with a hydrophilic polymer are distributed substantially homogeneously without aggregates in the hydrophilic polymer of the biomaterial.

The polymer part of the biomaterial according to the invention preferably contains a quantity of superparamagnetic iron oxide particles which is proportional to the desired specific signal and especially to the desired extinction signal.

The polymer part of the biomaterial preferably comprises on the order of about $10^{-1}$% to about $10^{-6}$% in dry weight of superparamagnetic iron oxide particles.

The hydrophilic polymer of the biomaterial is preferably selected from among:
- the polysaccharides in their natural or modified forms, in the form of amides, esters, ethers, urethanes and the like;
- the proteins in their native or denatured forms as well as the polypeptides and their derivatives;
- the acrylic polymers, such as polyacrylic and methacrylic acids, their salts, esters, amides, anhydrides, nitriles and their copolymers;
- the polymers of the polycarboxylic acids such as fumaric, maleic, malic, succinic and citric acids, their salts, esters, amides, anhydrides, nitriles and their copolymers;
- polyethylene or polyoxyethylene glycol, their derivatives and copolymers;
- polyethylene imine, its derivatives and copolymers;
- polystyrene sulfonate and polystyrene phosphonate, their derivatives and copolymers;
- polyvinyl sulfonate and polyvinyl phosphonate, their derivatives and copolymers;
- vinyl polyalcohol, its derivatives and copolymers;
- the polyvinyl pyridines, their salts, derivatives and copolymers;
- polyvinyl pyrrolidone, its derivatives and copolymers; or a mixture of at least two of these.

The polymer complexing the superparamagnetic iron oxide particles is preferably selected from among:
- the polysaccharides in their natural or modified forms, in the form of amides, esters, ethers, urethanes and the like;
- the proteins in their native or denatured forms as well as the polypeptides and their derivatives;
- the acrylic polymers, such as polyacrylic and methacrylic acids, their salts, esters, amides, anhydrides, nitriles and their copolymers;
- the polymers of the polycarboxylic acids such as fumaric, maleic, malic, succinic and citric acids, their salts, esters, amides, anhydrides, nitriles and their copolymers;

polyethylene or polyoxyethylene glycol, their derivatives and copolymers;

polyethylene imine, its derivatives and copolymers;

polystyrene sulfonate and polystyrene phosphonate, their derivatives and copolymers;

polyvinyl sulfonate and polyvinyl phosphonate, their derivatives and copolymers;

vinyl polyalcohol, its derivatives and copolymers;

the polyvinyl pyridines, their salts, derivatives and copolymers;

polyvinyl pyrrolidone, its derivatives and copolymers; or a mixture of at least two of these.

The biomaterial according to the invention can thus constitute:

an implant for vascular occlusion (solutions, suspensions, particles and the like), to fill natural cavities (anatomic: vessels, ureters, peritoneal cavity, articular cavity, spongy bone and the like), to fill artificial cavities (prostheses, probes and the like) or to fill surgical cavities (vitrectomy, bone resection); or a tissue reconstruction biomaterial: sphincters, wrinkles, plastics of tubes or tissue planes and the like; or a body surface covering biomaterial (healthy or burned skin, airways, gastrointestinal tracts and the like), catheters, probes, drains or prostheses (articular, vascular and the like); or an implantable or non-implantable marker-reference coordinate (stereotaxic localization, catheterization and the like); or all or part of a medical device which can be wholly or partially implantable, or not implantable.

The biomaterial according to the invention can be in the form of a hydrogel.

The biomaterial can be in the form:

of a hydrated block to allow mass production of a biomaterial ready for implantation which can be cut out on an as-needed basis;

of hydrated gel particles to enable creation of irregular particles or microspheres by emulsion-suspension; or of a block or particles of dried gel; or of a dry or wet film to enable creation of a coating for an implantable medical device or an implantable biomaterial; or of a filament to enable creation of occlusion spirals; or of powders used as such and taking up water from corporeal fluids, or used after incorporation in a liquid or a biomaterial charged with water; or of a viscous injectable solution, of varying degrees of viscosity and which can solidify in situ in a tissue or an organ and a viscous solution for soaking and covering; or any other form;

each form being capable of use as such or combined with another biomaterial.

The invention also pertains to a process for preparation of a biomaterial charged with superparamagnetic iron oxide particles to have a signal different from that of the uncharged material and that of the biological environment in which it is placed for one or more types of MRI sequences, the biomaterial being constituted of at least one hydrophilic polymer.

This process is characterized in that one mixes in an aqueous solution of hydrophilic monomers, superparamagnetic iron oxide particles complexed with a hydrophilic polymer constituted of a monomer which is substantially identical to or different from the first hydrophilic monomer, then one polymerizes the mixture to obtain a polymer hydrogel in which are distributed substantially homogenously without aggregates the superparamagnetic iron oxide particles complexed with a hydrophilic polymer.

The superparamagnetic iron oxide particles are preferably stabilized prior to being complexed. They are then complexed by a hydrophilic polymer or possibly by a hydrogel. The polymer layer isolates each particle from the other particles and prevents their aggregation. This makes it possible to suspend the particles at different concentrations for their incorporation in a mixture of hydrophilic monomers before polymerization or a mixture of water-soluble polymers before cross-linking.

Adjustment of the thickness of the complexation makes it possible to control the minimal spacing between the iron oxide crystals in the suspension before polymerization or cross-linking, for example.

The hydrophilic polymer constituting the biomaterial can also be a water-soluble polymer. One then cross-links the mixture formed by this water-soluble polymer and the complexed superparamagnetic iron oxide particles to obtain a polymer hydrogel in which the superparamagnetic iron oxide particles complexed with a water-soluble polymer are distributed substantially homogeneously without aggregates.

The ratio by weight of hydrophilic monomers or water-soluble polymers and superparamagnetic iron oxide particles complexed with a hydrophilic or water-soluble polymer is preferably between about $10^{-6}$ and about $10^{-1}$%.

The hydrophilic polymer constituting the biomaterial can be selected, for example, from among:

the polysaccharides in their natural or modified forms, in the form of amides, esters, ethers, urethanes and the like;

the proteins in their native or denatured forms as well as the polypeptides and their derivatives;

the acrylic polymers, such as polyacrylic and methacrylic acids, their salts, esters, amides, anhydrides, nitriles and their copolymers;

the polymers of the polycarboxylic acids such as fumaric, maleic, malic, succinic and citric acids, their salts, esters, amides, anhydrides, nitriles and their copolymers;

polyethylene or polyoxyethylene glycol, their derivatives and copolymers;

polyethylene imine, its derivatives and copolymers;

polystyrene sulfonate and polystyrene phosphonate, their derivatives and copolymers;

polyvinyl sulfonate and polyvinyl phosphonate, their derivatives and copolymers;

vinyl polyalcohol, its derivatives and copolymers;

the polyvinyl pyridines, their salts, derivatives and copolymers;

polyvinyl pyrrolidone, its derivatives and copolymers; or a mixture of at least two of these and the hydrophilic polymer complexing the superparamagnetic iron oxide particles can be selected, for example, from among:

the polysaccharides in their natural or modified forms, in the form of amides, esters, ethers, urethanes and the like;

the proteins in their native or denatured forms as well as the polypeptides and their derivatives;

the acrylic polymers, such as polyacrylic and methacrylic acids, their salts, esters, amides, anhydrides, nitriles and their copolymers;

the polymers of the polycarboxylic acids such as fumaric, maleic, malic, succinic and citric acids, their salts, esters, amides, anhydrides, nitriles and, their copolymers;

polyethylene or polyoxyethylene glycol, their derivatives and copolymers;

polyethylene imine, its derivatives and copolymers;

polystyrene sulfonate and polystyrene phosphonate, their derivatives and copolymers;

polyvinyl sulfonate and polyvinyl phosphonate, their derivatives and copolymers;

vinyl polyalcohol, its derivatives and copolymers;

the polyvinyl pyridines, their salts, derivatives and copolymers;

polyvinyl pyrrolidone, its derivatives and copolymers; or a mixture of at least two of these.

The two hydrophilic polymers are selected advantageously to be:

substantially identical; or such that they have a great affinity for each other in general or when they are placed in a particular medium; or such that the hydrophilic polymer constituting the biomaterial does not enable complexing the superparamagnetic iron oxide particles, but that the other hydrophilic polymer can provide this function; or such that the hydrophilic polymer complexing the superparamagnetic iron oxide particles remains dispersed substantially homogeneously in the cross-linking of the hydrophilic polymer constituting the biomaterial when this latter polymerizes or precipitates; or such that both polymers are resorbable or not resorbable.

When the two hydrophilic polymers are different, the hydrophilic polymer complexing the superparamagnetic iron oxide particles is preferably more hydrophilic than the hydrophilic polymer constituting the biomaterial, this latter polymer being capable of being dispersed in a solution containing a nonaqueous solvent.

For better comprehension of the invention, examples of implementation with dextran-coated magnetite crystals are presented below. These examples do not prevent the use of other complexed forms of magnetic oxides.

EXAMPLE 1

Block Gel

The following were mixed in a glass tube: 2.5 g of N-acryloyl-tris(hydroxymethyl)methylamine monomer (Polysciences Europe, Eppelheim, Germany), 0.2 g of methylene-bisacrylamide (Polysciences Europe, Eppelheim, Germany), 0.05 g of ammonium persulfate+6 ml of deionized water.

Separately, solutions were prepared diluted in water (to $1/10^{th}$, $1/100^{th}$, $1/1000^{th}$, $1/10,000^{th}$, (vol/vol) of dextran-magnetite (commercial Endorem solution, Laboratoires Guerbet, Aulnay, France).

5 microliters of dextran-magnetite solution was added to the mixture of monomers. Then, under agitation, 20 microliters of tetramethylethylenediamine 99% (Acros, Gel, Belgium) was added.

After polymerization, coherent homogeneous gels, translucent, slightly yellowish for those with the highest concentrations of dextran-magnetite were obtained. The most highly charged gel contained 1 micromole of iron per 8 ml of gel, i.e., 0.125 µmole Fe/ml gel.

The tubes of charged gel and multiple controls (uncharged gels, water, oil, commercial solution of dextran-magnetite at the same concentration as that of the most highly charged gel) were examined in MRI (0.2 tesla) with three sequences: T1 (SE 490/18 (90°), T2 (SE 2000/80 (120°)), FE 3d (60/20 (20°)). The uncharged gel was spontaneously in hypersignal in MRI in relation to the water, in T1, in T2 and in FE as illustrated in FIGS. 1 and 2. In T1 the signal of the charged gel decreased inversely with the augmentation of the charge of complexed marker. It was very different from the signal of the oil (hypersignal) and the marker solution (hypersignal).

In T2 the signal decreased with the augmentation of the charge of complexed marker. It was very different from the signal of the oil (medium signal), the marker solution (hyposignal) and the water (hypersignal).

In FE the signal decreased inversely with the augmentation of the charge of complexed marker. It was very different from the signal of the oil (medium signal), the marker solution (hyposignal) and the water (hypersignal).

The uncharged gel was different from the gels charged at more than $1/10,000^{th}$. It was not very different from the least charged gel. The gel that was the most highly charged in marker and the water containing the same charge concentration were very different in sequences T1 and T2 and in FE.

In summary, the gel enriched in marker loses its hypersignal in T1, in T2 and in FE, and did so in a manner proportional to the concentration. A homogeneous distribution of the complexed marker in the gel was easily obtained.

EXAMPLE 2

Fragmented Gel in Suspension

A hydrogel was prepared as in the example with a charge concentration identical to that of the most highly charged gel cited in Example 1. The gel was fragmented into particles which were suspended in physiological serum. Several days later, the signal of the particles in suspension and that of the supernatant were studied using the MRI technique of Example 1.

Figure 3:
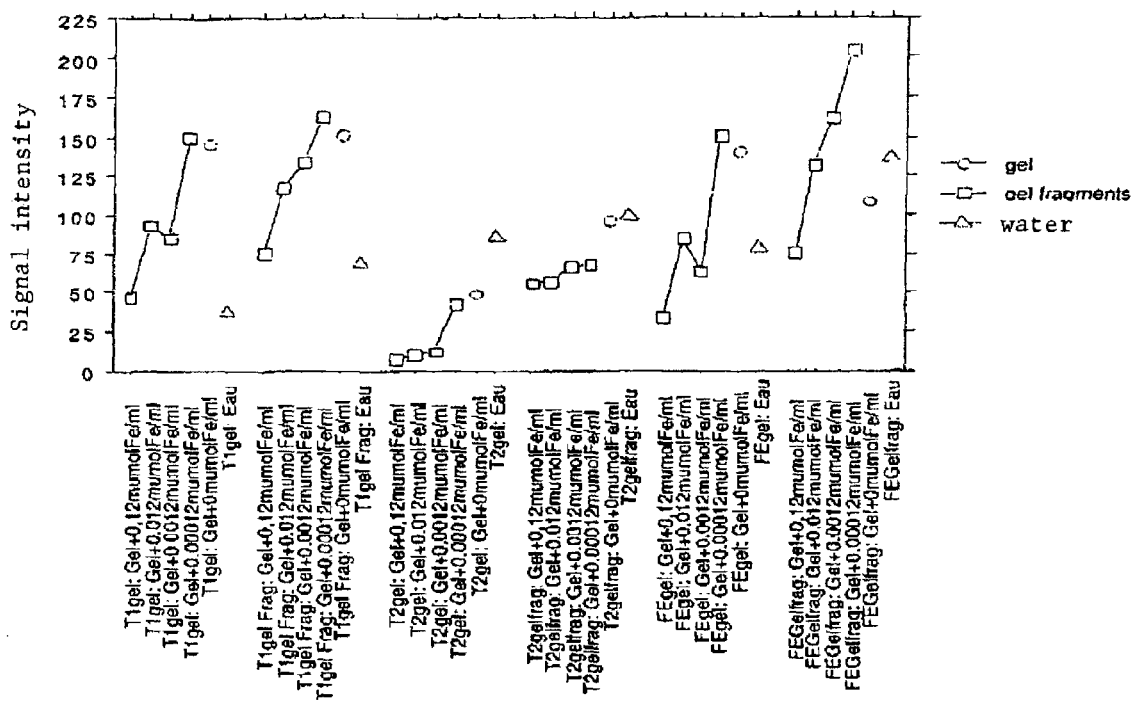
FIG. 3 is a comparative table demonstrating that there is no major difference in signal intensity between a gel and a fragmented gel produced by the process according to the invention.

Results: the fragments of charged gel presented the same characteristics as the gels of Example 1, as illustrated in FIG. 3. The supernatant liquid had the same characteristics as the physiological serum alone.

Figure 4:
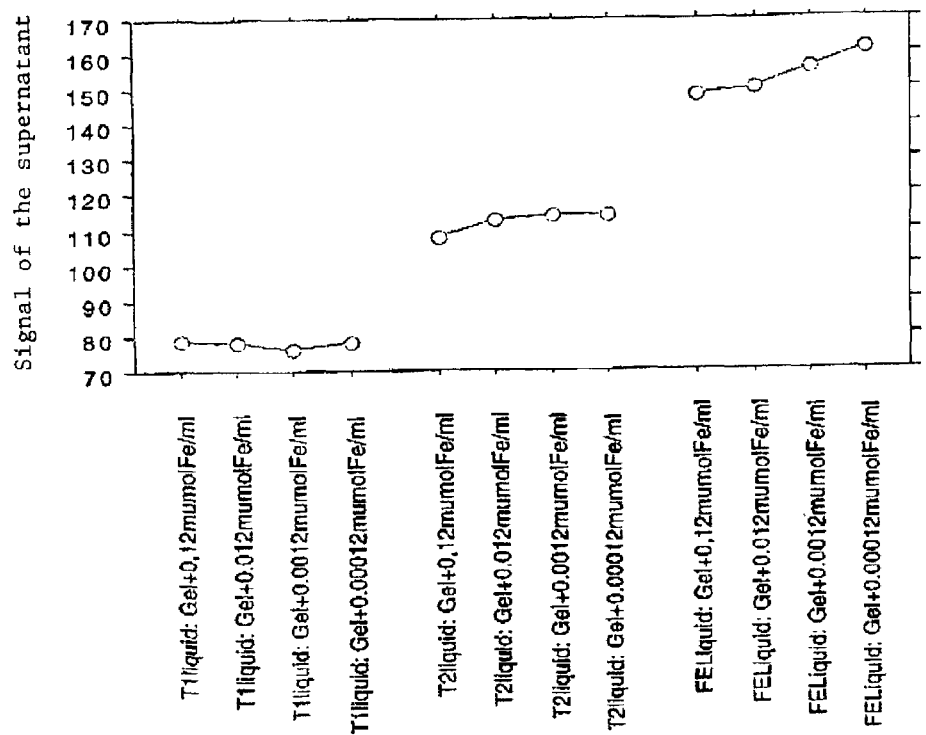
FIG. 4 illustrates liquids in which are found the fragmented gel particles, the liquids not having signal modifications after four days, irrespective of their concentration of marker complex.

There was no variation of the signal of the supernatant liquid proportional to the quantity of marker present in the gel fragments, indicating the lack of liberation of marker, as illustrated in FIG. 4.

EXAMPLE 3

Dry Powder

A hydrogel was prepared as in example 2. It was fragmented in the mixer and dried by lyophilization. This produced a powder constituted of charged particles. It was also possible to dry the hydrogel block and then fragment it to obtain a similar result.

EXAMPLE 4

PHEMA Microspheres Charged with Tris+Dextran Magnetite Powder

Into a glass 250-ml reactor equipped with an agitator, 100 ml of paraffin oil and 1 ml of nonionic surface-active agent (Span 80) was introduced. The mixture was then heated to 60° C.

Separately, 2.4 ml of hydroxyethyl methacrylate (Polysciences Europe, Eppelheim, German), 0.1 ml of ethyleneglycol-dimethacrylate (Polysciences Europe, Eppelheim, Germany), 0.10 mg of azobisisobutyronitrile and 0.1 g of powder obtained according to Example 3 was mixed together. The mixture was dispersed in paraffin oil and heated at 75° C. under strong agitation.

Agitation was stopped after 30 minutes. The mixture was cooled and decanted. The oily phase was aspirated and the resulting beads were filtered, then washed with a detergent aqueous solution and then with water. They had a water content of about 40%. Their diameters were between 0.1 and 1 mm. In MRI, they had the same signalization has the charged gels of Example 2.

EXAMPLE 5

Preparation of Blocks and Fragments of Gelatin Charged with Tris+Dextran Magnetite Powder 5 ml of a 4% (weight/volume) soluble human collagen (Sigma, C7521) in 5% acetic acid was prepared. 0.1 g of charged hydrogel powder obtained according to Example 3 was added. Cross-linking was performed with the addition of 1 ml of aqueous solutions of glutaraldehyde (Sigma, G7526). The mixture was maintained at 30° C. for 3 hours. A charged gelatin was obtained which was then fragmented into blocks or particles which could in turn be used to create an injectable viscous suspension.

EXAMPLE 6

Gelling Solution Marked with the Powder 10 ml of a 10% (w/v) solution of PHEMA (Polysciences Europe, Eppelheim, Germany) in ethanol was prepared. 0.1 g of dry powder of charged gel obtained according to Example 3 was added. Multiple ml of this solution was injected via a catheter into the bloodstream of a test subject and gelled it by elimination of solvent and absorption of water. The resultant gel had a signal of the type of the charged gels of Example 1.

The invention claimed is:

1. A charged biomaterial, comprising:
   at least one first hydrophilic polymer in the form of a hydrogel; and
   superparamagnetic iron oxide particles complexed with a second hydrophilic polymer substantially identical to or different from the first hydrophilic polymer;
   wherein:
   the superparamagnetic iron oxide particles complexed with the second hydrophilic polymer are distributed substantially homogeneously and substantially without aggregates in the first hydrophilic polymer; and
   the charged biomaterial is detectable in magnetic resonance imaging (MRI) and has a significant signal extinction that is substantially homogeneous throughout the material in medical MRI sequences.

2. The biomaterial according to claim 1, wherein the first hydrophilic polymer contains a quantity of superparamagnetic iron oxide particles which is proportional to a desired signal.

3. The biomaterial according to claim 1, wherein the second hydrophilic polymer comprises about $10^{-1}$% to about $10^{-6}$% in dry weight of the superparamagnetic iron oxide particles.

4. The biomaterial according to claim 1, wherein the first hydrophilic polymer is selected from the group consisting of:
   polysaccharides in natural or modified form;
   proteins in native or denatured form and polypeptides;
   acrylic polymers, salts, esters, amides, anhydrides, nitriles thereof and copolymers thereof;
   polymers of polycarboxylic acids, salts, esters, amides, anhydrides, nitriles thereof and copolymers thereof;
   polyethylene and polyoxyethylene glycol and copolymers thereof;
   polyethylene imine and copolymers thereof;
   polystyrene sulfonate, polystyrene phosphonate and copolymers thereof;
   polyvinyl sulfonate, polyvinyl phosphonate and copolymers thereof;
   vinyl polyalcohol and copolymers thereof;
   polyvinyl pyridines, salts and copolymers thereof;
   polyvinyl pyrrolidone and copolymers thereof; and mixtures thereof.

5. The biomaterial according to claim 1, wherein the second hydrophilic polymer complexing the superparamagnetic iron oxide particles is selected from the group consisting of:
   polysaccharides in natural or modified form;
   proteins in native or denatured form and polypeptides;
   acrylic polymers, salts, esters, amides, anhydrides, nitriles thereof and copolymers thereof;
   polymers of polycarboxylic acids, salts, esters, amides, anhydrides, nitriles thereof and copolymers thereof;
   polyethylene and polyoxyethylene glycol and copolymers thereof;
   polyethylene imine and copolymers thereof;
   polystyrene sulfonate, polystyrene phosphonate and copolymers thereof;
   polyvinyl sulfonate, polyvinyl phosphonate and copolymers thereof;
   vinyl polyalcohol and copolymers thereof;
   polyvinyl pyridines, salts and copolymers thereof;
   polyvinyl pyrrolidone and copolymers thereof; and
   mixtures thereof.

6. The biomaterial according to claim 1 in the form of an implant for vascular occlusion, filling natural cavities, filling artificial cavities or filling surgical cavities.

7. The biomaterial according to claim 1 in the form of a tissue reconstruction biomaterial.

8. The biomaterial according to claim 1 in the form of a covering for body surfaces, catheters, probes, drains or prostheses.

9. The biomaterial according to claim 1 in the form of an implantable or nonimplantatable marker-reference coordinate.

10. The biomaterial according to claim 1 in the form of:
    a hydrated block;
    hydrated gel particles;
    a block or particles of dried gel;
    a dry or wet film;
    a filament;
    powders;
    an injectable viscous solution; or
    combinations thereof.

11. A process for preparing a charged biomaterial detectable in magnetic resonance imaging (MRI) having a significant signal extinction which is substantially homogeneous throughout the material in medical MRI sequences, comprising:
    forming an aqueous solution of hydrophilic monomers and superparamagnetic iron oxide particles complexed with a hydrophilic polymer comprising monomers substantially identical to or different from the hydrophilic monomers,
    polymerizing the solution and forming a polymer hydrogel in which are distributed substantially homogeneously and substantially without aggregates the superparamagnetic iron oxide particles complexed with the hydrophilic polymer.

12. The process according to claim 11, wherein the hydrophilic monomers are water-soluble and cross-links the solution.

13. The process according to claim 11, wherein the ratio by weight of hydrophilic monomers or water-soluble polymers and superparamagnetic iron oxide particles is between about $10^{-6}$ and about $10^{-1}$%.

14. The process according to claim 11, further comprising lyophilizing or drying the hydrogel.

15. The process according to claim 11, wherein the first hydrophilic polymer is selected from the group consisting of:
   polysaccharides in natural or modified form;
   proteins in native or denatured form and polypeptides;
   acrylic polymers, salts, esters, amides, anhydrides, nitriles thereof and copolymers thereof;
   polymers of polycarboxylic acids, salts, esters, amides, anhydrides, nitriles thereof and copolymers thereof;
   polyethylene and polyoxyethylene glycol and copolymers thereof;
   polyethylene imine and copolymers thereof;
   polystyrene sulfonate, polystyrene phosphonate and copolymers thereof;
   polyvinyl sulfonate, polyvinyl phosphonate and copolymers thereof;
   vinyl polyalcohol and copolymers thereof;
   polyvinyl pyridines, salts and copolymers thereof;
   polyvinyl pyrrolidone and copolymers thereof; or
   mixtures thereof.

16. The process according to claim 11, wherein the second hydrophilic polymer is selected from the group consisting of:
   polysaccharides in natural or modified form;
   proteins in native or denatured form and polypeptides;
   acrylic polymers, salts, esters, amides, anhydrides, nitriles thereof and copolymers thereof;
   polymers of polycarboxylic acids, salts, esters, amides, anhydrides, nitriles thereof and copolymers thereof;
   polyethylene and polyoxyethylene glycol and copolymers thereof;
   polyethylene imine and copolymers thereof;
   polystyrene sulfonate, polystyrene phosphonate and copolymers thereof;
   polyvinyl sulfonate, polyvinyl phosphonate and copolymers thereof;
   vinyl polyalcohol and copolymers thereof;
   polyvinyl pyridines, salts and copolymers thereof;
   polyvinyl pyrrolidone and copolymers thereof; or
   a mixture of at least two of these.

17. A charged biomaterial comprising:
   at least one first hydrophilic polymer in the form of a hydrogel, wherein the at least one first hydrophilic polymer is an acrylic polymer or a salt, an ester, an amide, a nitrile or copolymers thereof, and
   superparamagnetic iron oxide particles complexed with a second hydrophilic polymer which is a polysaccharide in natural or modified form,
   wherein the superparamagnetic iron oxide particles complexed with the second hydrophilic polymer are distributed substantially homogeneously and substantially without aggregates in the first hydrophilic polymer.

18. A charged biomaterial comprising:
   a first hydrophilic polymer in the form of a hydrogel, wherein the at least one first hydrophilic polymer is a polymer comprising N-acryloyl-tris(hydroxymethyl) methylamine monomer units, and
   superparamagnetic iron oxide particles complexed with a second hydrophilic polymer which is dextran,
   wherein the superparamagnetic iron oxide particles complexed with the second hydrophilic polymer are distributed substantially homogeneously and substantially without aggregates in the first hydrophilic polymer.

19. A process for preparing a charged biomaterial comprising:
   forming an aqueous solution of hydrophilic acrylic monomers or salts, esters, amides or nitriles thereof and superparamagnetic iron oxide particles complexed with a hydrophilic polymer which is polysaccharide in natural or modified form,
   polymerizing the solution and forming a polymer hydrogel in which are distributed substantially homogeneously and substantially without aggregates the superparamagnetic iron oxide particles complexed with the hydrophilic polymer.

20. A process for preparing a charged biomaterial comprising:
   forming an aqueous solution of hydrophilic monomers of methylene-bisacrylamide and superparamagnetic iron oxide particles complexed with a hydrophilic polymer which is dextran, and
   polymerizing the solution and forming a polymer hydrogel in which are distributed substantially homogenously and substantially without aggregates the superparamagnetic iron oxide particles complexed with the hydrophilic polymer.

21. The biomaterial according to claim 1, wherein the first hydrophilic polymer is selected from the group consisting of an acrylic polymer, polymers of polycarboxylic acids, a polyethylene glycol, a polyoxyethylene glycol, a polyethyleneimine, a polystyrene sulphonate, a polystyrene phosphonate, a vinyl polyalcohol, a polyvinyl pyridine, a polyvinyl pynolidone, a polyvinyl sulphonate, and a polyvinyl phosphonate.

22. The process according to claim 11, wherein the first hydrophilic polymer is selected from the group consisting of an acrylic polymer, polymers of polycarboxylic acids, a polyethylene glycol, a polyoxyethylene glycol, a polyethyleneimine, a polystyrene sulphonate, a polystyrene phosphonate, a vinyl polyalcohol, a polyvinyl pyridine, a polyvinyl pyrrolidone, a polyvinyl sulphonate, and a polyvinyl phosphonate.

23. A charged biomaterial, comprising:
   a hydrogel comprising a first hydrophilic polymer; and
   a plurality of complexes comprising a superparamagnetic iron oxide particle and a second hydrophilic polymer;
   wherein:
   the complexes are distributed substantially homogenously and substantially without aggregates in the hydrogel;
   the first hydrophilic polymer is the same as or different from the second hydrophilic polymer; and
   the biomaterial is detectable in magnetic resonance imaging (MRI) and has a significant signal extinction that is substantially homogeneous throughout the material in medical MRI sequences.

* * * * *